Patented Mar. 30, 1943

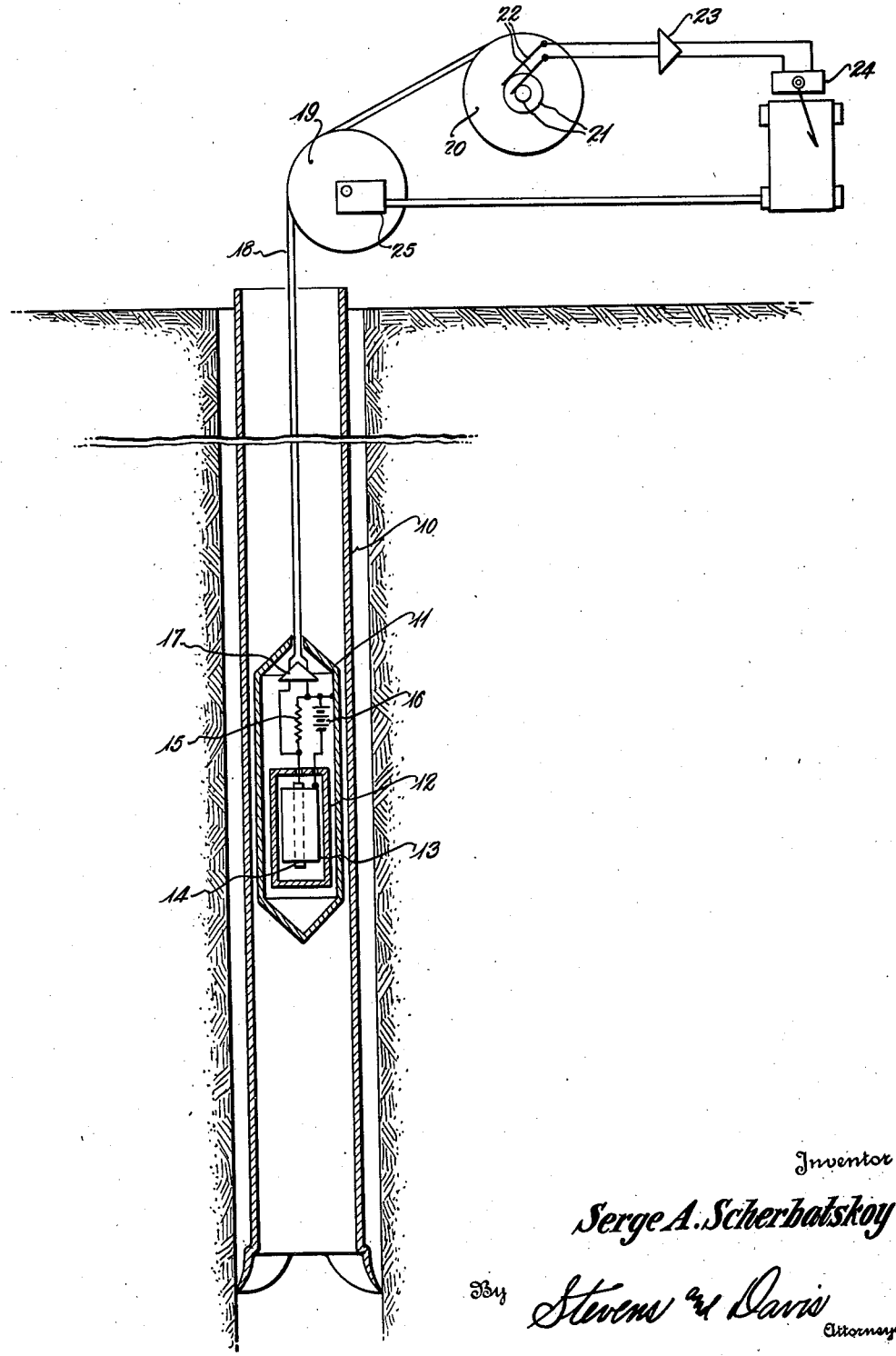

2,315,355

UNITED STATES PATENT OFFICE 2,315,355

WELL SURVEYING METHOD AND APPARATUS

Serge Alexander Scherbatskoy, Tulsa, Okla., assignor to Well Surveys, Incorporated, Tulsa, Okla., a corporation of Delaware Application April 30, 1940, Serial No. 332,565

4 Claims. (Cl. 250—83.6)

This invention relates to geophysical prospecting and more particularly to a method and apparatus for determining the nature of geological formations that lie alongside of a well bore that is in the process of being drilled.

Various methods have been devised for determining the nature of strata through which a drilling operation is progressing but none has been entirely free from important mechanical difficulties and sources of relatively large errors. Perhaps the commonest method of determining the nature of the structures through which the drilling has progressed has been to observe the cuttings from the drill as they come to the surface. These cuttings, however, are always badly intermixed and greatly diluted by the mud that is used to carry them to the surface and hence observation of them is a relatively poor way to gain the desired information.

Another method that is used quite extensively is that of taking core samples but for this purpose it is necessary to remove the drill stem from the well, put a coring bit on the end of the drill stem, lower it and then remove the drill stem with the coring bit after the sample has been taken. All of this takes a great deal of time, particularly if the well is of any considerable depth, and even core samples are often badly contaminated with material knocked off of the sides of the well in taking the sample or carried down to the bottom of the well by the mud that circulates during the drilling operation.

As alternatives to these methods, the drill stem and drill may be periodically removed from the well and a survey of the well made by electrical resistivity methods such as the one commonly known as the "Schlumberger" method. Radioactive methods such as the one shown in application Serial No. 161,350 filed August 27, 1937, by Jacob Neufeld may also be used by lowering a detector of raidoactivity into the open hole after the drill has been removed. Any of these methods, however, as they have heretofore been practiced necessitate the removal of the drill from the hole, and unless casing has been set in the hole, involve the danger of the instrument being lost by collapse of the side walls.

The present invention involves a relatively simple but important improvement in the previous methods in that by the use of one of the previous methods and by taking advantage of one of its important characteristics it has been found possible to make a survey of a drill hole and determine the nature of the formations adjacent it at various levels without even removing the drill from the hole. In addition to making easier the surveying process by eliminating the necessity of removing the drill from the hole the new process also eliminates the danger of loss of the surveying instrument due to collapse of the walls of an open drill hole.

Briefly, the present invention involves taking advantage of the fact that certain radioactive radiations will penetrate relatively great thicknesses of steel by constructing a surveying instrument that operates by radioactivity and which is small enough to be lowered down inside of a drill stem. With such an instrument it is possible merely to stop the drilling operation, remove the mud connection at the top of the drill stem and lower the surveying instrument down inside the drill stem without ever lifting the drill out of the hole. The drill stem protects the instrument from the possibility of its becoming wedged in the hole due to any collapse of the side walls and the survey can be quickly and easily made with very little interruption in drilling.

The survey so made may be one of natural radioactivity of the surrounding strata in correlation with depth but need not necessarily be this simple type of measurement. Instead, it may be a measurement of secondary or induced or scattered radioactivity caused by a primary source of radioactivity lowered into the well with the surveying instrument, or it may be a selective measurement of a particular type of radioactivity such as gamma rays, slow neutrons, fast neutrons or other radiations, or a measurement of the spectral distribution of any of these types of radiations.

Specifically, the principles of this invention may be applied to the making of surveys of the type described in the following patent applications as well as to surveys of the type described in Patent No. 2,133,776, granted to John C. Bender on October 18, 1938, or any other similar types of surveys:

| Serial number | Filing date | Inventor |
| --- | --- | --- |
| 161,350 | Aug. 27, 1937 | Jacob Neufeld. |
| 239,781 | Nov. 10, 1938 | Robert E. Fearon. |
| 277,964 | June 7, 1939 | Jacob Neufeld. |
| 279,577 | June 16, 1939 | S. A. Scherbatskoy. |
| 299,767 | Oct. 16, 1939 | Do. |
| 288,456 | Aug. 4, 1939 | Do. |
| 323,239 | Mar. 9, 1940 | Jacob Neufeld. |
| 323,981 | Mar. 14, 1940 | Robert E. Fearon. |
| 326,510 | Mar. 28, 1940 | Do. |

As a simple example that will illustrate the principles of this invention there is illustrated in the single figure of the drawing, in diagrammatic form, an embodiment of the principles of this invention so constructed that it will measure the natural radioactivity of the surrounding strata and correlate these measurements with determinations of the depths at which they are made.

As illustrated a drill 10 has been driven into the earth for some distance and the mechanism that forces the mud through the drill stem has been removed. The drill table and the derrick are not shown but would be of the usual type and would normally remain in position during the surveying operation. They play no part in the surveying operation however. The drill stem as shown in the drawing appears relatively short but obviously could be and would be in most cases many feet long.

The measuring instrument consists of a casing 11, generally cylindrical in shape and of small enough diameter to pass down inside of the drill stem 10. Within this casing is an ionization chamber 12 containing a pair of electrodes 13 and 14 and a gas such as argon under a high pressure of around 1500 to 2000 pounds per square inch. The electrode 14 is usually an iron rod and the electrode 13 a sheet iron shell which surrounds it.

Connections from each of the electrodes pass through insulating bushing in the chamber walls and outside of the chamber but within the casing 11 they are bridged by a resistor 15 in series with a battery 16. The resistor is usually of about $10^{12}$ ohms resistance and the battery of about 150 volts potential. The two are connected in series, preferably with the negative side of the battery connected to the outer electrode 13 and the positive side of the battery connected to one end of the resistor 15 and also grounded to the casing 11. Across the resistor 15 is connected an amplifier 17 which amplifies the potential drop across the resistor, which potential drop is proportional to the current flow through the ionization chamber and hence to the intensity of the radioactive radiations which impinge upon it.

The amplified current from the amplifier 17 is carried to the surface over a cable 18 which also serves to support the measuring instrument in the drill stem. At the surface the cable 18 passes over a measuring wheel 19 and is wound onto a reel or drum 20. The reel 20 is driven by a source of power not shown to raise and lower the instrument in the drill stem and the electrical conductors in the cable are connected through this reel to slip rings 21 mounted thereon. From the slip rings the currents from the cable are picked up by brushes 22 and conveyed to an amplifier 23 and then to a recorder 24.

The tape of the recorder 24 is preferably driven from the measuring wheel 19 by a mechanical connection 25, or by an electrical connection such as a "Selsyn" transmission system. This causes the tape to move as the measuring instrument moves up and down in the well and thus the measurements of radioactivity are directly correlated with determinations of the depths at which they are taken.

I claim:

1. A method of geophysical prospecting that comprises lowering a detector of radioactivity into a drill hole through the stem of the drill being used to drill the hole, and simultaneously continuously recording the radioactivity of formations surrounding the drill stem as an indication of their nature.

2. A method of geophysical prospecting that comprises drilling a hole in the earth in the usual manner, stopping the drilling operation, disconnecting the usual mud supplying mechanism from the top of the drill stem, lowering a detector of radioactivity through the drill stem and recording the radioactivity detected at various levels within said drill stem as indications of the nature of the surrounding strata.

3. A method of geophysical prospecting that comprises lowering into a drill hole through the stem of the drill used to make the hole an instrument for continuously detecting radioactivity, continuously determining the depth at which said instrument is located in said drill hole, and continuously recording on the surface the measurements made by said measuring instrument in correlation with the determinations of its depth.

4. A method of geophysical prospecting during the drilling of a well bore that comprises moving a radioactivity detector at known depths within the drill stem and continuously during the movement of said detector, recording the radioactivity detected as an index of the nature of said formations.

SERGE ALEXANDER SCHERBATSKOY.